(12) United States Patent
Kamiyama et al.

(10) Patent No.: US 11,557,273 B2
(45) Date of Patent: Jan. 17, 2023

(54) VEHICLE WHEEL

(71) Applicant: HONDA MOTOR CO., LTD., Tokyo (JP)

(72) Inventors: Youichi Kamiyama, Wako (JP); Yuta Shimamura, Wako (JP); Mikiharu Nakanishi, Wako (JP); Takuro Hama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 631 days.

(21) Appl. No.: 16/679,746

(22) Filed: Nov. 11, 2019

(65) Prior Publication Data

US 2020/0160823 A1 May 21, 2020

(30) Foreign Application Priority Data

Nov. 16, 2018 (JP) .............................. JP2018-215830

(51) Int. Cl.
*G10K 11/172* (2006.01)
*B60B 21/12* (2006.01)

(52) U.S. Cl.
CPC ............ *G10K 11/172* (2013.01); *B60B 21/12* (2013.01); *B60B 2900/133* (2013.01)

(58) Field of Classification Search
CPC .. G10K 11/172; B60B 21/12; B60B 2900/133
See application file for complete search history.

(56) References Cited

U.S. PATENT DOCUMENTS

| | | | |
|---|---|---|---|
| 2010/0090520 A1* | 4/2010 | Kamiyama | ........... B60B 21/028 301/95.104 |
| 2011/0057505 A1* | 3/2011 | Nagata | ...................... B60B 1/06 301/95.102 |
| 2020/0009905 A1* | 1/2020 | Kamiyama | ............. B60B 21/12 |
| 2020/0010029 A1* | 1/2020 | Kamiyama | ............. B60B 21/12 |
| 2020/0010030 A1* | 1/2020 | Kamiyama | ............. B60B 25/22 |
| 2020/0070572 A1* | 3/2020 | Saito | ..................... B60B 21/026 |
| 2020/0164683 A1* | 5/2020 | Saito | ....................... B60B 21/12 |

FOREIGN PATENT DOCUMENTS

| | | | |
|---|---|---|---|
| JP | 5657309 B2 | 1/2015 | |
| WO | WO-2017159829 A1 * | 9/2017 | ............. B60B 21/02 |

* cited by examiner

*Primary Examiner* — Forrest M Phillips
(74) *Attorney, Agent, or Firm* — Rankin, Hill & Clark LLP (57) ABSTRACT

Provided is a vehicle wheel with which manufacturing costs can be reduced. The vehicle wheel includes a sub air chamber member as a Helmholtz resonator on a well portion of a rim. The sub air chamber member includes a protrusion portion which protrudes toward the rim, and the rim has a hole portion into which the protrusion portion is inserted to engage with the sub air chamber.

4 Claims, 6 Drawing Sheets

VEHICLE WHEEL

CROSS-REFERENCE TO RELATED APPLICATION

The present application claims the benefit of priority to Japanese Patent Application No. 2018-215830 filed on Nov. 16, 2018, the disclosures of all of which are hereby incorporated reference in their entireties.

TECHNICAL FIELD

The invention relates to vehicle wheel.

BACKGROUND OF THE INVENTION

There has been known a vehicle wheel including Helmholtz resonators on an outer peripheral surface of a well portion of a rim thereof (Japanese Patent No. 5657309, for example). The Helmholtz resonator of the vehicle wheel is, on both sides thereof in a wheel width direction, provided with a pair of rising walls of a well portion, which face to each other over the resonator. In particular, circumferential grooves are formed in respective facing surfaces of the rising walls so as to extend in a wheel circumferential direction. Then, both edge portions in the wheel width direction of the Helmholtz resonator are fitted into and engaged in the respective circumferential grooves.

According to such a vehicle wheel, even when a large centrifugal force acts on the Helmholtz resonator at high speed rotation of the wheel, the Helmholtz resonator is securely held with respect to the rim.

SUMMARY OF THE INVENTION

However, in the related-art vehicle wheel (see Japanese Patent No. 5657309, for example), the circumferential grooves configured to engage the Helmholtz resonator are formed by cutting. In this cutting process, an operator is required to move a cutting tool every time the operator presses the cutting tool against the rotating wheel to form each of the pair of circumferential grooves. Therefore, there arises a problem in the related-art vehicle wheel that a forming process of the circumferential grooves is complicated to increase manufacturing costs of the wheel.

An aspect of the present invention is to provide a vehicle wheel required less manufacturing costs than the related-art vehicle wheel.

A vehicle wheel of the present invention to solve the problem is a vehicle wheel including a sub air chamber member as a Helmholtz resonator on a well portion of a rim thereof, wherein the sub air chamber member includes a protrusion portion which protrudes toward the rim, and wherein the rim has a hole portion into which the protrusion portion is inserted to engage with the sub air chamber member.

According to the present invention, the manufacturing costs are reduced as compared with those of the related-art.

DETAILED DESCRIPTION OF THE PREFERRED EMBODIMENTS

Next, a vehicle wheel according to an embodiment of the present invention will be described in detail with reference to the drawings as appropriate. In the drawings to be referred to, "X" indicates a wheel circumferential direction, and "Y" indicates a wheel width direction, and "Z" indicates a wheel radial direction, respectively. Further, in the wheel width direction Y, a central side of an outer peripheral surface of a well portion of the wheel may be referred to as "inner side in the wheel width direction Y", and a rim flange side of the wheel may be referred to as "outer side in the wheel width direction Y".

<Entire Structure of Vehicle Wheel>

Figure 1:
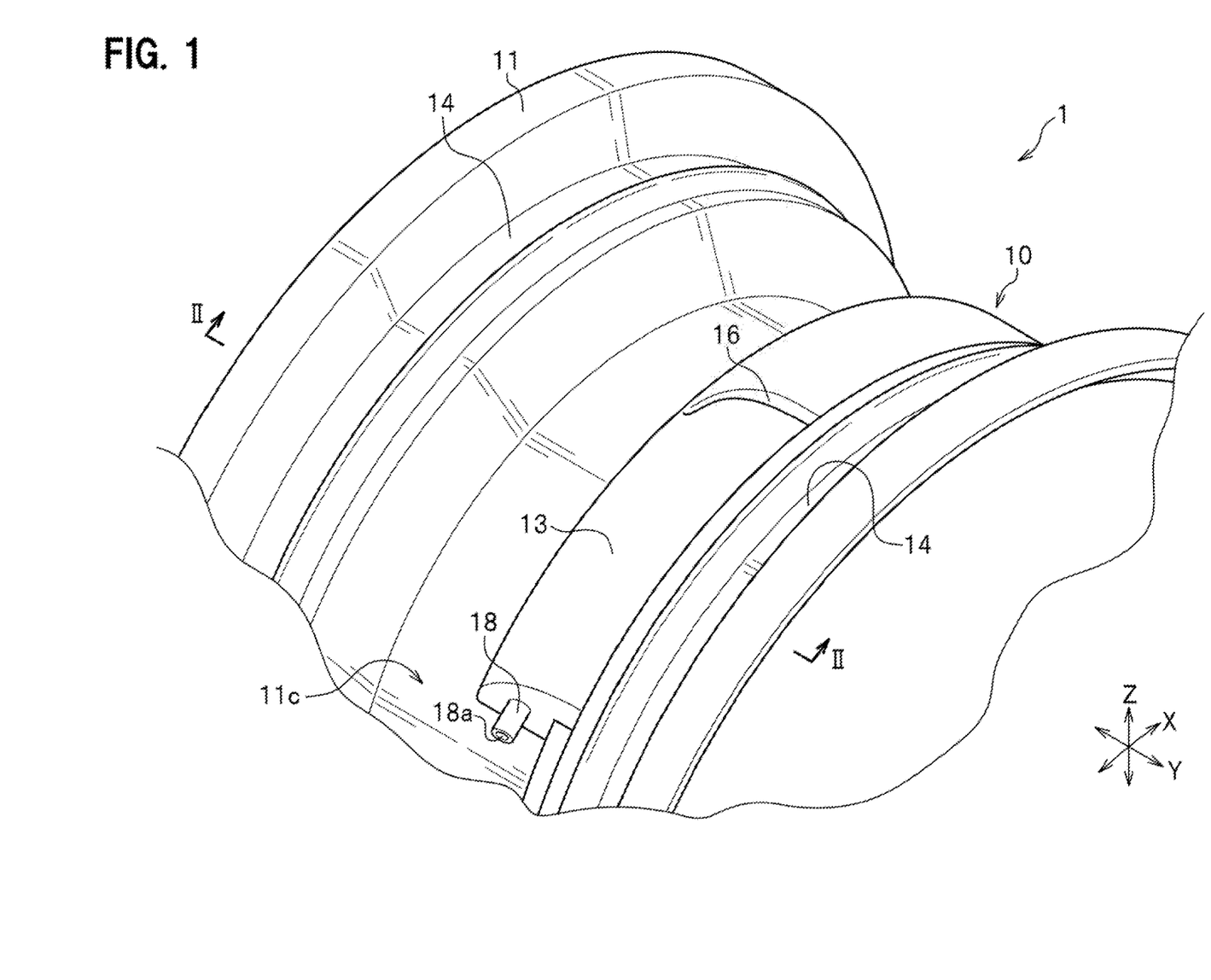
FIG. 1 is a perspective view of a vehicle wheel according to an embodiment of the present invention.
Figure 2:
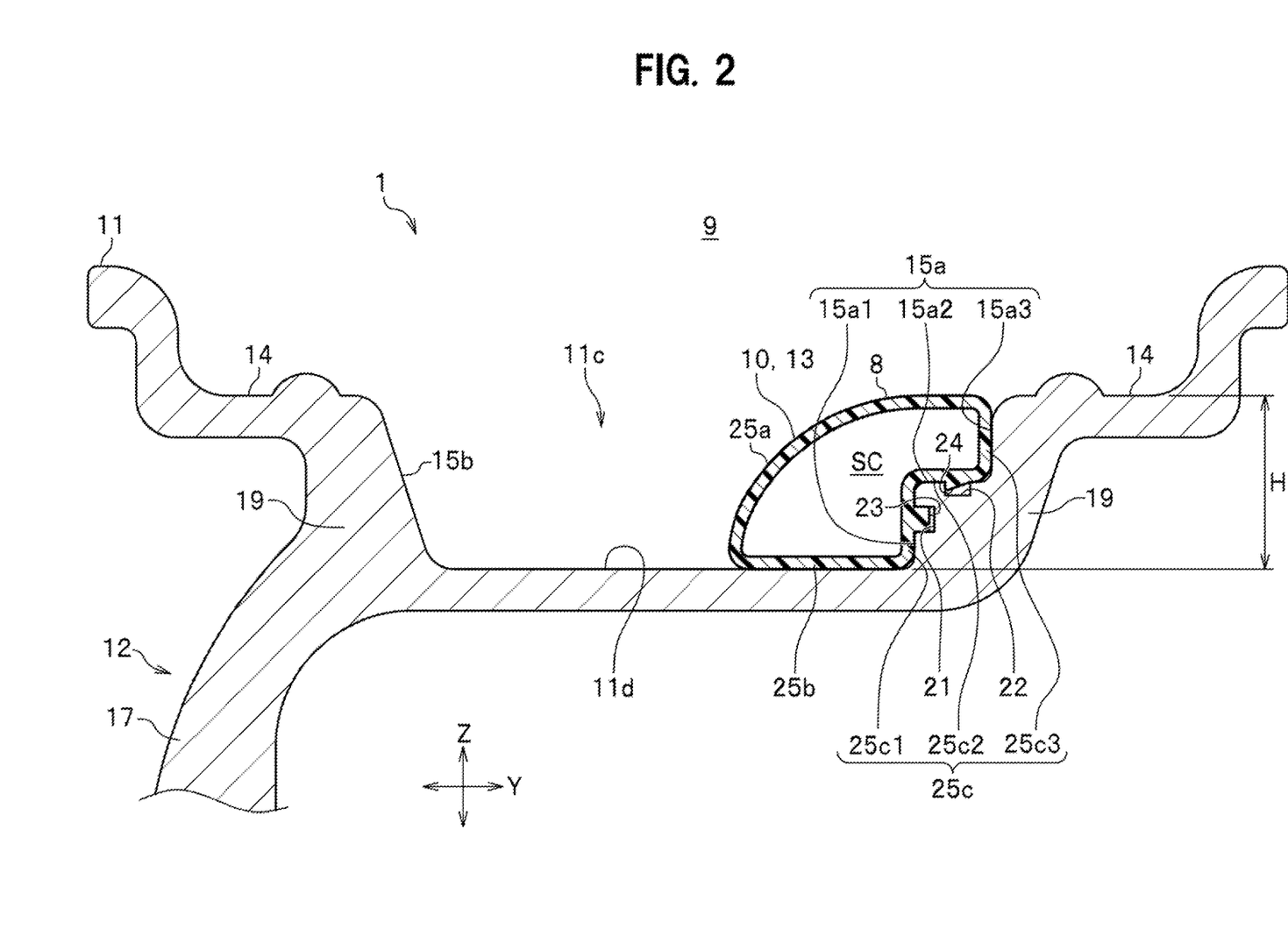
FIG. 2 is a cross-sectional view taken along a line II-II in FIG. 1.

FIG. 1 is a perspective view of a vehicle wheel 1 according to an embodiment of the present invention. FIG. 2 is a cross-sectional view taken along a line II-II in FIG. 1.

As illustrated in FIG. 1, the vehicle wheel 1 according to the present embodiment includes a sub air chamber member 10 as a Helmholtz resonator on a well portion 11c of a rim 11.

The rim 11 in the present embodiment is assumed to be made of a light metal such as an aluminum alloy or a magnesium alloy, but is not limited thereto as long as the rim 11 includes a thick portion to be described below.

The vehicle wheel 1 includes the rim 11 on which a tire is mounted, and a disk (not shown) configured to couple the rim 11 to a hub (not shown).

The sub air chamber member 10, which will be described in detail below, is arranged next to an opposite side (on an opposite side from a design surface) in the wheel width direction Y with respect to the disc forming the design surface.

As illustrated in FIG. 2, the rim 11 includes the well portion 11c recessed inward in the wheel radial direction Z between bead seats 14, which are formed at both end portions in the wheel width direction Y, respectively. An outer peripheral surface 11d of the well portion 11c defined by a bottom surface of the recess has substantially the same diameter across the wheel width direction Y about a wheel axis.

The rim 11 of the present embodiment includes: a first vertical wall 15a formed on the opposite side (on the opposite side from the design surface) with respect to a disk 12; and a second vertical wall 15b on a side of the disk 12, that is, on the side facing the first vertical wall 15a across the well portion 11c. These vertical walls 15a and 15b are assumed to be formed by rising portions from the outer peripheral surface 11d of the well portion 11c toward the rim flanges.

The first vertical wall 15a forms a step-shaped differently leveled portion, to which the sub air chamber member 10 described below, is mounted. The first vertical wall 15a is formed in a thick portion 19, described below, on the opposite side from the design surface.

In particular, the first vertical wall 15a includes a first wall 15a1 rising from the outer peripheral surface 11d of the well 11c outward in the wheel radial direction Z, a second wall 15a2 extending outward in the wheel width direction Y from an upper end (outer end in the wheel radial direction Z) of the first wall 15a1, and a third wall 15a3 rising outward in the wheel radial direction Z from an outer end in the wheel width direction Y of the second wall 15a2.

In FIG. 2, reference numeral 17 denotes a spoke portion forming the disk 12. A plurality of spoke portions 17 are assumed to be radially arranged at equal intervals about a rotation center of the wheel 1. Reference numerals 19 denote thick portions which are formed to have thicker walls than other portions of the rim 11, at which rim flanges or the like are formed. The thick portions 19 in the present embodiment are formed by respective portions of the rim 11 positioned outside in the wheel width direction Y of the vertical walls 15a and 15b, but the thick portions in the present invention are not limited thereto.

Reference numeral 21 denotes a first hole formed in the first wall 15a1 in the thick portion 19 on the opposite side from the design surface. Reference numeral 22 denotes a second hole formed in the second wall 15a2 in the thick portion 19 on the opposite side from the design surface.

The first hole 21 is formed to be open inward in the wheel width direction Y, and to be recessed outward in the wheel width direction Y. Further, the second hole 22 is formed to be open outward in the wheel radial direction Z, and to be recessed inward in the wheel radial direction Z.

The first hole 21 in the present embodiment is assumed to be a round hole into which a cylindrical-shaped first protrusion 23 (see FIG. 4), to be described below, fits. Further, the second hole 22 in the present embodiment is assumed to be an angular hole into which a second protrusion 24 (see FIG. 4) forming an inclined protrusion, to be described below, fits.

<Sub Air Chamber Member>

Next, the sub air chamber member 10 (see FIG. 1) will be described.

As described above, the sub air chamber member 10 (Helmholtz resonator) is arranged so as to be adjacent to the bead seat 14 on the opposite side from the design surface. In particular, as illustrated in FIG. 2, the sub air chamber member 10 is arranged so as to be in contact with the step-shaped first vertical wall 15a and the outer peripheral surface 11d of the well portion 11c.

The sub air chamber member 10 is formed of a box body having a hollow portion therein. The sub air chamber member 10 of the present embodiment is assumed to be a resin molded member made of a material such as polypropylene and polyamide, but may be formed of other material such as a metal plate.

As illustrated in FIG. 1, the sub air chamber member 10 includes a main body portion 13 formed to be elongated in the wheel circumferential direction X, and pipe bodies 18 forming communication holes 18a at both ends in the wheel circumferential direction X of the main body portion 13.

The sub air chamber member 10 as described above is formed to be symmetrical in the wheel circumferential direction X about a partition wall 16 as a boundary, which extends in the wheel width direction Y at the center of the main body portion 13.

Figure 3:
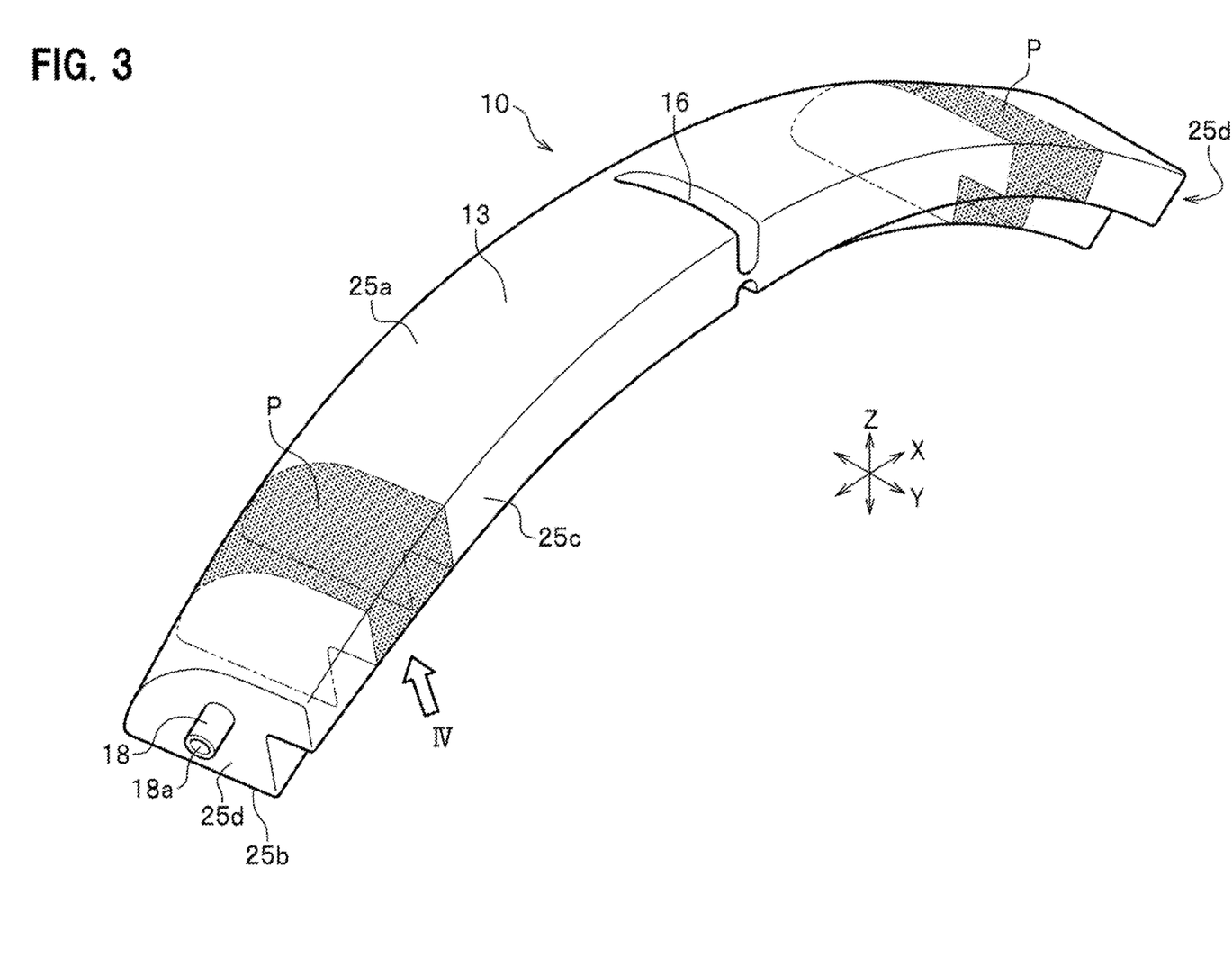
FIG. 3 is an entire perspective view of a sub air chamber member.

FIG. 3 is an entire perspective view of the sub air chamber member 10.

As illustrated in FIG. 3, the main body portion 13 of the sub air chamber member 10 is curved in the longitudinal direction thereof. That is, the main body portion 13 is arranged on the outer peripheral surface 11d of the well portion 11c so as to run along the wheel circumferential direction X.

The main body portion 13 is hollow inside. The hollow portion (not shown) defines sub air chambers SC (see FIG. 2). The hollow portion is divided into two portions in the wheel circumferential direction X by the partition wall 16. The partition wall 16 is formed by a portion of an upper plate 25a and a portion of a bottom plate 25b, which form the main body portion 13, recessed in a groove shape in the wheel width direction Y. Though not illustrated, the partition wall 16 is formed by the portion of the upper plate 25a and the portion of the bottom plate 25b, which will be described below, joined to each other at the substantially center of the hollow portion.

As illustrated in FIG. 2, the main body portion 13 of the sub air chamber member 10 includes the upper plate 25a, the bottom plate 25b, and a side plate 25c.

The bottom plate 25b is formed of a plate body formed so as to run along the outer peripheral surface 11d of the well portion 11c. That is, the bottom plate 25b is formed to be substantially flat in the wheel width direction Y. The bottom plate 25b is formed to be curved at substantially the same curvature as that of the outer circumferential surface 11d in the wheel circumferential direction X (see FIG. 1).

The side plate 25c is formed to include a first wall 25c1, a second wall 25c2, and a third wall 25c3 to correspond to the step-shaped differently leveled portion forming the first vertical wall 15a of the rim 11.

That is, the first wall 25c1 is in contact with the first wall 15a1 of the rim 11, the second wall 25c2 is in contact with the second wall 15a2 of the rim 11, and the third wall 25c3 is in contact with the third wall 15a3 of the rim 11.

The lower end (inner end in the wheel radial direction Z) of the first wall 25c1 is connected to the outer end in the wheel width direction Y of the bottom plate 25b.

The upper end (outer end in the wheel radial direction Z) of the third wall 25c3 is positioned at the same height as a height H of the bead seat 14 of the rim 11.

The upper plate 25a is arranged above the bottom plate 25b (outward in the wheel radial direction Z).

The outer end in the wheel width direction Y of the upper plate 25a is connected to the upper end of the side plate 25c (third wall 25c3).

Further, as the height of the upper plate 25a from the outer peripheral surface 11d of the well portion 11c gradually decreases as the upper plate 25a extends inward from the outer end in the wheel width direction Y. In particular, the upper plate 25a is curved so as to protrude obliquely upward from the inner end in the wheel width direction Y.

The inner end in the wheel width direction Y of the upper plate 25a is connected to the inner end in the wheel width direction Y of the bottom plate 25b.

The sub air chamber SC is defined inside surrounded by the upper plate 25a, the bottom plate 25b, and the side plate 25c.

Further, the sub air chamber member 10 formed of the upper plate 25a, the bottom plate 25b, and the side plate 25c as described above is made to have the height of an outer surface 8 in the wheel radial direction Z equal to or less than the height H of the bead seat 14 of the rim 11.

As illustrated in FIG. 3, the main body portion 13 includes end plates 25d, which connect the upper plate 25a, the bottom plate 25b, and the side plate 25c together, arranged at both end portions in the wheel circumferential direction X. These end plates 25d are formed to be symmetrical with each other about the partition wall 16 as the boundary.

Further, as illustrated in FIG. 2, the sub air chamber member 10 has the first protrusion 23 and the second protrusion 24 which protrude toward the rim 11.

The first protrusion 23 and the second protrusion 24 make a pair to each other, and as illustrated in FIG. 3, the pair is provided in each of two shaded areas P.

As illustrated in FIG. 3, the respective areas P in the present embodiment are set at positions adjacent to the respective two endplates 25d so as to be symmetrical with each other about the partition wall 16 as the boundary.

Figure 4:
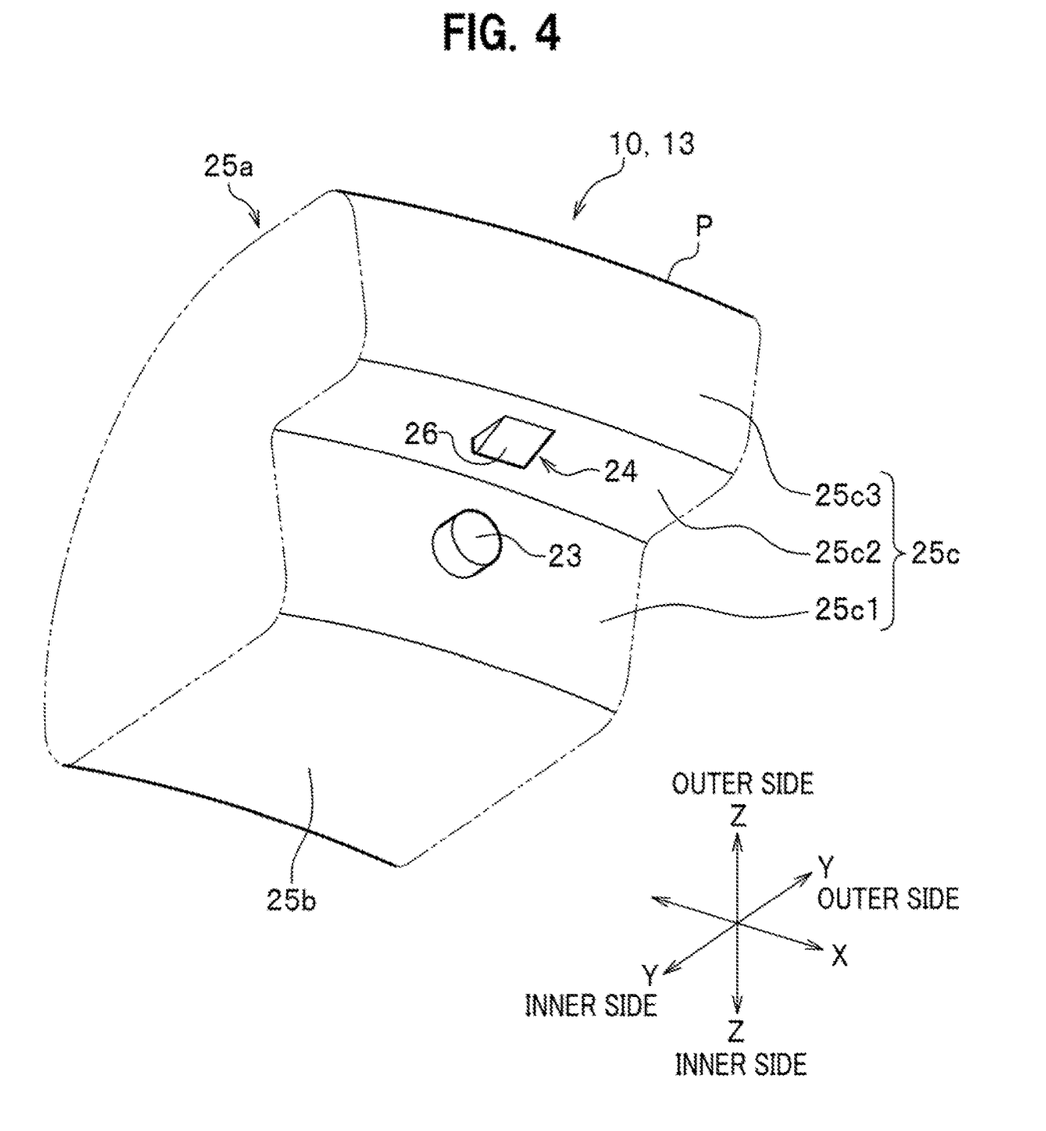
FIG. 4 is a partial perspective view of the sub air chamber member as viewed from an arrow IV direction of FIG. 3.

FIG. 4 is a partial perspective view of the sub air chamber member of the area P of the two areas P of the sub air chamber member 10 illustrated in FIG. 3, as viewed from an arrow IV direction, on a near side in a plane of paper of FIG. 3.

The respective areas P are in a symmetrical structure with each other about the partition wall 16 as the boundary so that only the area P on the near side in a plane of paper of FIG. 3 will be described, and the area P on a far side in a plane of paper of FIG. 3 will not be described.

In FIG. 4, the reference numeral 25c1 denotes a first wall of the main body portion 13 of the sub air chamber member 10, the reference numeral 25c2 denotes a second wall of the main body portion 13, and the reference numeral 25c3 denotes the third wall of the main body portion 13.

As illustrated in FIG. 4, the first protrusion 23 composed of a cylindrical-shaped protrusion, which protrudes outward in the wheel width direction Y, is formed on the first wall 25c1 of the main body portion 13.

The first protrusion 23 of the present embodiment is assumed to be cylindrical, but the shape of the first protrusion 23 is not limited thereto. The first protrusion 23 can have any shape to be fitted into the first hole 21 (see FIG. 2) formed in the rim 11.

Further, the second protrusion 24, which is an inclined protrusion and protrudes inward in the wheel radial direction Z, is formed on the second wall 25c2 of the main body portion 13.

The inclined protrusion forming the second protrusion 24 has a rectangular planar shape.

Further, the inclined protrusion has an inclined surface 26 which is inclined more away from the second wall 25c2 as extending more inward from the outer side in the wheel width direction Y.

The second protrusion 24 may be also formed in a hemispherical shape.

Next, the pipe bodies 18 (see FIG. 3) will be described. As illustrated in FIG. 3, the pipe bodies 18 are formed so as to protrude in the wheel circumferential direction X from the end surfaces (end plates 25d) in the wheel circumferential direction X of the main body portion 13.

As described above, the sub air chamber member 10 in the present embodiment is symmetrical in the wheel circumferential direction X about the partition wall 16 as the boundary. Therefore, the pipe bodies 18 of the present embodiment are arranged at both end portions in the longitudinal direction (wheel circumferential direction X) of the main body portion 13 to make a pair at positions symmetrical with each other.

Further, communication holes 18a are formed inside the pipe bodies 18. The communication holes 18a cause the sub air chambers SC (see FIG. 2) formed inside the main body portion 13 to communicate with a tire air chamber 9 (see FIG. 2) formed between the well portion 11c (see FIG. 2) and the tire (see FIG. 2).

Though not illustrated, the pair of pipe bodies 18 is arranged at positions away from each other at an interval subtending approximately 90 degrees about the wheel axis.

The sub air chamber member 10 including the pipe bodies (communication holes 18a), which are arranged at the interval as described above, is different from the related-art wheel in that the sub air chamber member 10 more reliably prevents so-called "unevenness in sound attenuation" of air column resonance sound.

The number of sub air chambers SC and the positions of the pipe bodies 18 are not limited thereto. Therefore, when the number of sub air chambers SC is equal to three, or equal to or more than five, the respective pipe bodies 18 can be arranged at equal intervals in the wheel circumferential direction X.

<Manufacturing Method for Vehicle Wheel>

Next, a description will be given of a manufacturing method for the vehicle wheel 1 according to the present embodiment.

Figure 5A:
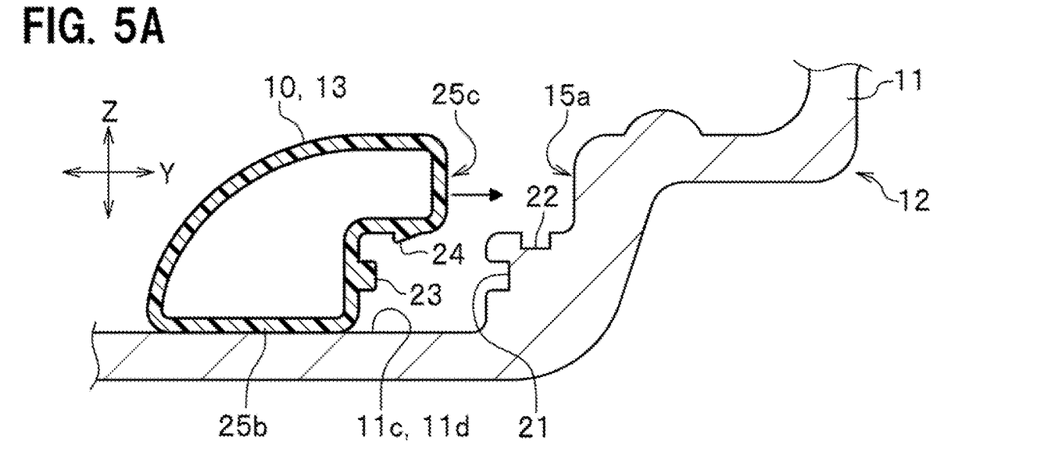
FIG. 5A, FIG. 5B, and FIG. 5C illustrate manufacturing processes of the vehicle wheel.
Figure 5B:
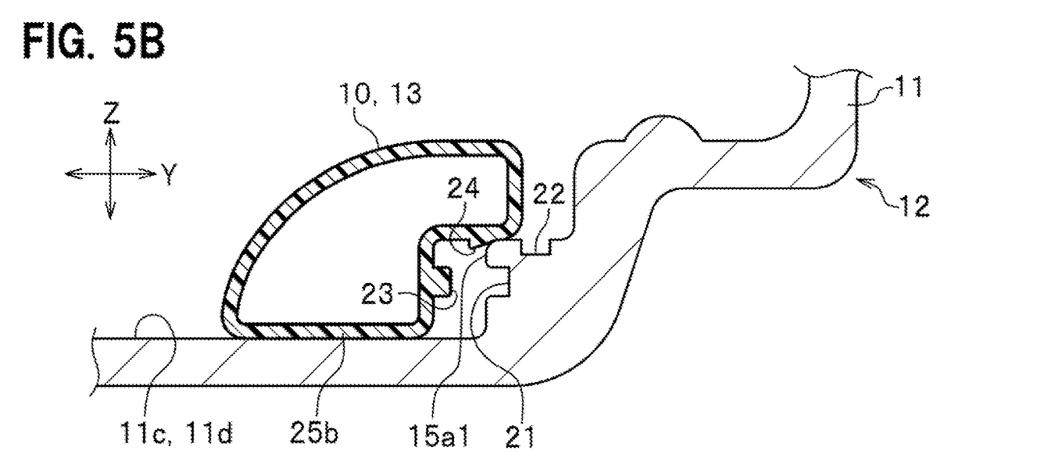
Figure 5C:
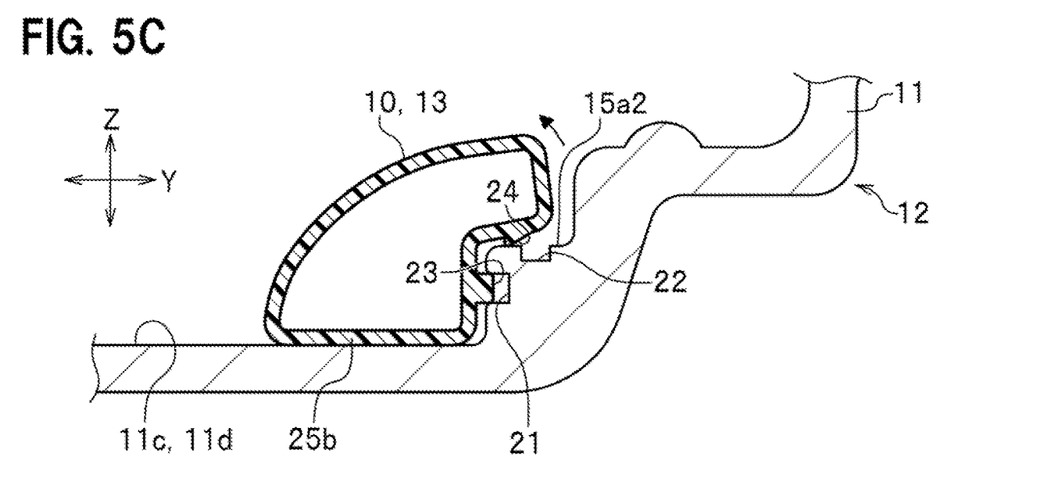

FIG. 5A to FIG. 5C illustrate manufacturing processes of the vehicle wheel 1. In FIG. 5A to FIG. 5C, only a portion of the rim 11, which is on the opposite side from the design surface to have the sub air chamber member 10 mounted, is illustrated for the sake of drawing.

As illustrated in FIG. 5A, in this manufacturing method, the sub air chamber member 10 is firstly arranged on the outer peripheral surface 11d of the well portion 11c at a position away from the first vertical wall 15a of the rim 11. On this occasion, the bottom plate 25b of the main body portion 13 is arranged so as to be in contact with the outer peripheral surface 11d.

Further, the side plate 25c of the main body portion 13 is arranged so as to face the first vertical wall 15a of the rim 11.

Next, as illustrated in FIG. 5B, in this manufacturing method, the sub air chamber member 10 is moved toward the first vertical wall 15. Accordingly, the second protrusion 24 of the sub air chamber member 10 is brought in contact with the upper end of the first wall 15a1 of the rim 11. Then, the sub air chamber member 10 is further moved toward the first vertical wall 15, to cause the second protrusion 24 to receive a reaction force from the upper end of the first wall 15a1.

As illustrated in FIG. 5C, in this manufacturing method, the sub air chamber member 10 is further moved toward the first vertical wall 15. As a result, a stepped portion of the sub air chamber member 10 is deformed elastically, and the second protrusion 24 slides on the inclined surface 26 to ride on the upper side of the second wall 15a2 of the rim 11. Further, the first protrusion 23 of the sub air chamber member 10 starts to be fitted into the first hole 21 of the rim 11.

Though not illustrated, when the sub air chamber member 10 is further moved toward the first vertical wall 15a to cause the second protrusion 24 to reach the second hole 22 of the rim 11, the elastic deformation in the stepped portion of the sub air chamber member 10 is restored so that the second protrusion 24 is fitted into the second hole 22.

Further, the first protrusion 23 of the sub air chamber member 10 is fitted into the first hole 21.

Then, as illustrated in FIG. 2, the first wall 25c1, the second wall 25c2, and the third wall 25c3 in the main body portion 13 of the sub air chamber member 10 come in contact with the first wall 15a1, the second wall 15a2, and the third wall 15a3 of the rim 11, respectively, to complete a series of processes in this manufacturing method.

<Advantageous Effects>

Next, a description will be given of advantageous effects obtained by the vehicle wheel 1 according to the present embodiment.

The rim 11 of the vehicle wheel 1 according to the present embodiment has the holes 21 and 22 configured to have the protrusions 23 and 24 of the sub air chamber member 10 inserted therein to engage with the sub air chamber member 10.

According to the vehicle wheel 1 as described above, which differs from the related-art wheel (see JP5657309, for example), the sub air chamber member 10 can be fixed without any circumferential grooves in the well portion 11c to cause an increase in manufacturing costs. The manufacturing costs of the vehicle wheel 1 can be reduced more than those of the related-art wheel.

Further, the holes 21 and 22 of the rim 11 are formed in the thick portion 19 of the rim 11. Therefore, the vehicle wheel 1 has improved freedom of design, such as in shape, depth, opening space, and three-dimensional structure of the holes 21 and 22.

Still further, the rim 11 has the second hole 22 which is open outward in the wheel radial direction Z, and the first hole 21 which is open inward in the wheel width direction Y.

When the sub air chamber member 10 is viewed in the wheel circumferential direction X, the respective protrusions 23 and 24 of the sub air chamber member to be fitted into the holes 21 and 22 as described above are fitted in directions crossing each other. In particular, the fitting directions of the protrusion 23 and the protrusion 24 are orthogonal to each other.

As a result, the sub air chamber member 10 is firmly fixed to the rim 11.

Further, the outer surface 8 in the wheel radial direction Z of the sub air chamber member 10 has a height equal to or less than the height H of the bead seat 14 of the rim 11.

In the vehicle wheel 1 including the sub air chamber member 10 as described above, when beads of the tire are dropped onto the well portion 11c at the time of mounting the tire on the rim, the interference of the beads of the tire with the sub air chamber member 10 is reduced, to facilitate mounting the tire onto the rim 11.

The height of the outer surface 8 in the wheel radial direction Z of the sub air chamber member 10 becomes gradually lower from the outer peripheral surface 11d of the well portion 11c, as the outer surface 8 extends from one outer end portion (end portion on the opposite side from the design surface) toward the other outer end portion (end portion on a side of the design surface) in the wheel width direction Y.

When the beads are dropped onto the well portion 11c at the time of mounting the tire on the rim, the sub air chamber member 10 as described above allows the beads to be smoothly moved on the sub air chamber member 10. This facilitates mounting the tire onto the rim.

Hereinabove, the embodiment of the present invention has been described, but the present invention is not limited thereto and can be implemented in various forms.

In the embodiment, the structure has been described in which the sub air chamber member 10 is fixed to the rim 11 only by fitting the protrusions 23 and 24 of the sub air chamber member 10 into the holes 21 and 22 formed in the rim 11. However, the present invention is not limited thereto, and, the protrusion-to-hole fixing structure may additionally be combined with other fixing structure to fix the sub air chamber member 10 to the rim 11.

Figure 6:
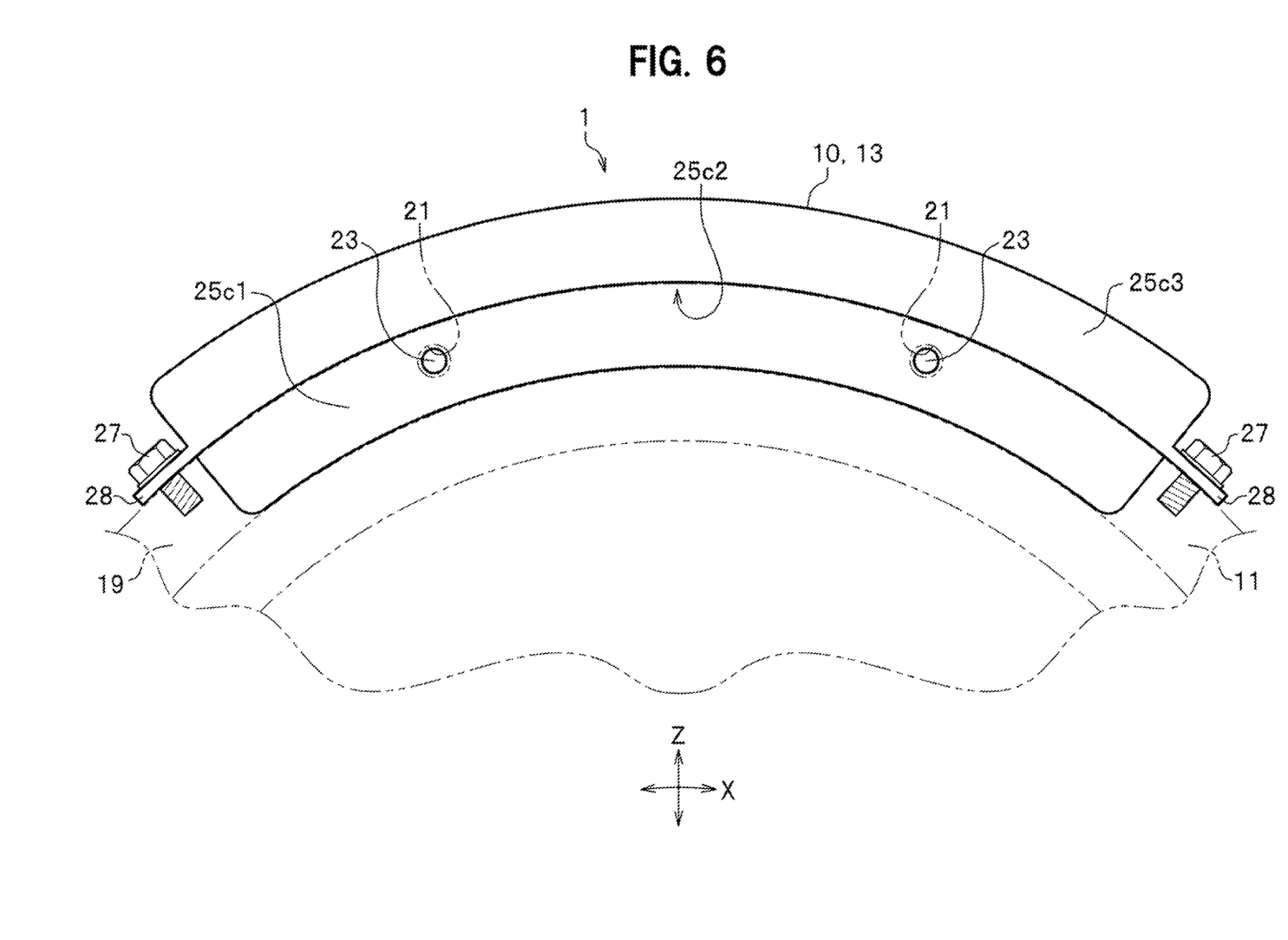
FIG. 6 is a side view of a modification of the vehicle wheel according to the present invention.

FIG. 6 to be referred to next is a side view of a modification of the vehicle wheel 1. In FIG. 6, components similar to those illustrated in the embodiment are denoted by the same reference numerals and the detailed description thereof will be omitted. Further, in FIG. 6, the rim 11 is indicated by an imaginary line (two-dot chain line) for convenience of drawing, and the pipe bodies and the partition wall of the sub air chamber member 10 are omitted.

In FIG. 6, the reference numerals 21 denote the first holes of the rim 11 into which the first protrusions 23 of the sub air chamber member 10 are fitted, and the reference numeral 19 denotes the thick portion.

As illustrated in FIG. 6, the vehicle wheel 1 according to the modification differs from the vehicle wheel 1 (see FIG. 2) of the embodiment in that the second protrusions 24 of the main body portion 13 of the sub air chamber member 10 and the second holes 22 formed in the rim 11 are dispensed with.

Further, the vehicle wheel 1 according to the modification differs from the vehicle wheel 1 (see FIG. 2) of the embodiment in that flange portions 28 are formed to respectively extend in the wheel circumferential direction X from both end portions in the wheel circumferential direction X of the main body portion 13.

Further, the vehicle wheel 1 according to the modification includes the sub air chamber member 10 fixed to the rim 11 with bolts 27 inserted into the flange portions 28.

In particular, both end portions in the wheel circumferential direction X of the sub air chamber member 10 are fastened in the wheel radial direction Z to the rim 11 with the bolts 27.

That is, when the sub air chamber member 10 is viewed in the wheel circumferential direction X, the fitting directions of the first protrusions 23 into the first holes and the fastening directions of the bolts 27 are substantially orthogonal to each other.

Though not illustrated, in the manufacturing processes of the vehicle wheel 1 according to the modification as described above, the first protrusions 23 are fitted into the first holes 21, and then both end portions of the sub air chamber member 10 are fastened to the rim 11 with the bolts 27.

The vehicle wheel 1 according to the modification as described above differs from the vehicle wheel 1 of the embodiment in FIG. 5A to FIG. 5C in that the sub air chamber member 10 is mounted to the rim 11 without having the elastic deformation of the sub air chamber member 10.

In the vehicle wheel 1 (see FIG. 2) of the embodiment, the structure of the sub air chamber member 10 being mounted to the thick portion 19 on the opposite side from the design surface has been described. However, in a so-called reversely mounted wheel having a bead-dropped portion (drop portion) located on the opposite side from the design surface, the sub air chamber member 10 can be mounted to the thick portion 19 (including the spoke portion 17) on the side of the design surface.

What is claimed is:

1. A vehicle wheel comprising a sub air chamber member as a Helmholtz resonator on a well portion of a rim of the vehicle wheel,
   wherein the sub air chamber member includes a first protrusion which protrudes toward the rim in a wheel width direction, and a second protrusion which protrudes toward the rim in a wheel radial direction, and
   wherein the rim has a first hole into which the first protrusion is fitted and which is open inward in the wheel width direction, and a second hole into which the second protrusion is fitted and which is open outward in the wheel radial direction.

2. The vehicle wheel as claimed in claim 1, wherein an outer surface in the wheel radial direction of the sub air chamber member is arranged to have a height equal to or less than a height of a bead seat of the rim.

3. The vehicle wheel as claimed in claim 1,
wherein the sub air chamber member is arranged next to one of both outer end portions in the wheel width direction of the well portion, and
wherein an outer surface in the wheel radial direction of the sub air chamber member has a height from an outer peripheral surface of the well portion gradually decreasing as the outer surface extends from one outer end portion toward the other outer end portion.

4. The vehicle wheel as claimed in claim 1, wherein, in addition to engagement by insertion of the first protrusion into the first hole and insertion of the second protrusion into the second hole, the sub air chamber member is fastened with a fastening device to the rim.

\* \* \* \* \*